Patented Feb. 17, 1953

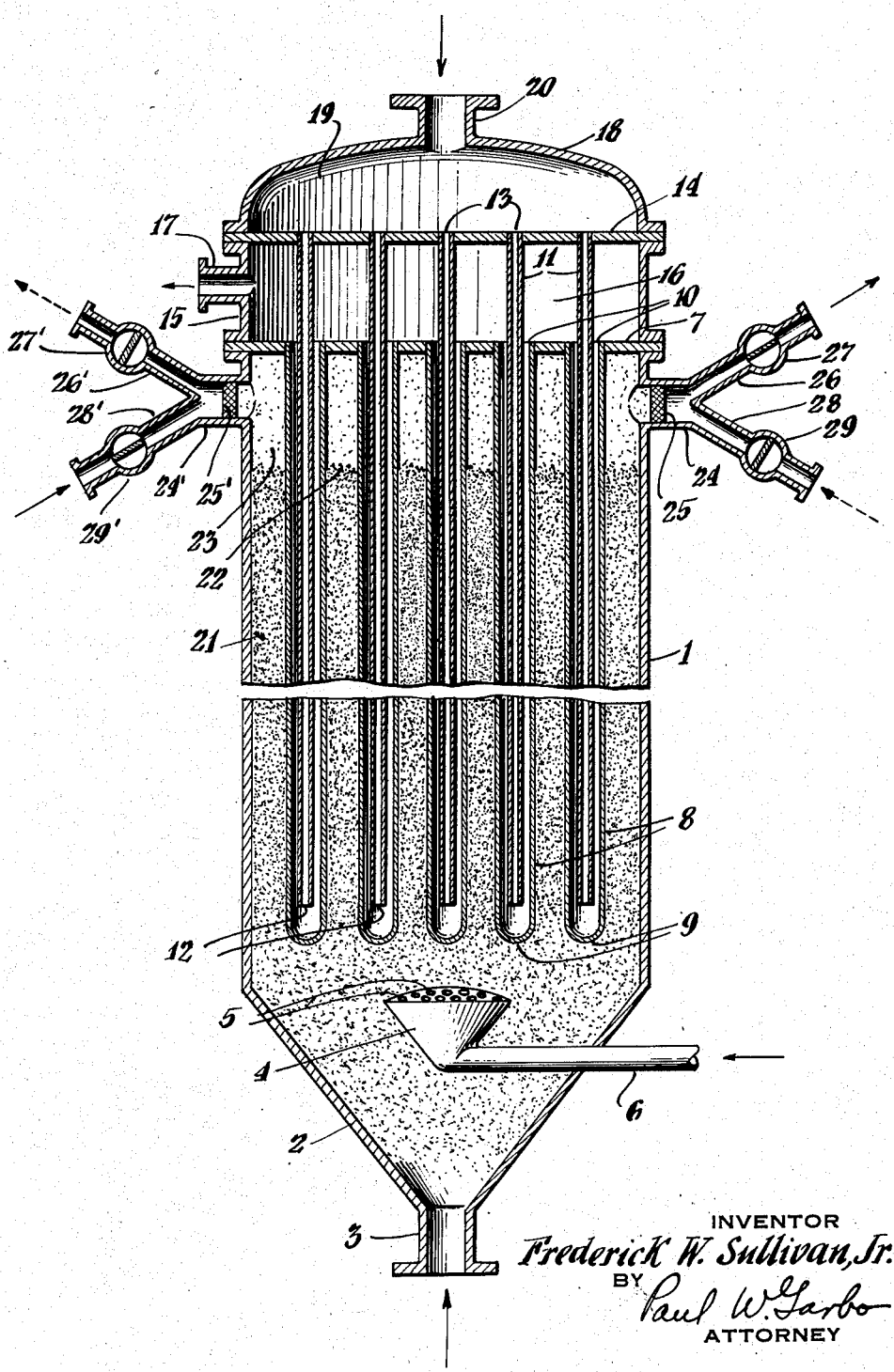
INVENTOR
Frederick W. Sullivan, Jr.
BY
Paul W. Garbo
ATTORNEY

2,628,965

UNITED STATES PATENT OFFICE 2,628,965

PREPARATION OF OLEFIN OXIDES

Frederick W. Sullivan, Jr., Summit, N. J., assignor to General Aniline & Film Corporation, New York, N. Y., a corporation of Delaware Application August 20, 1946, Serial No. 691,855

6 Claims. (Cl. 260—348.5)

This invention relates to the production of valuable olefin oxides by vapor-phase catalytic oxygenation of olefins in refinery gases and similar hydrocarbon mixtures containing olefins and other compounds highly reactive with oxygen.

In recent years the manufacture of ethylene oxide has steadily grown in commercial importance because of its wide use as raw material in the preparation of organic products including glycol, plasticizers, resins and surface active agents. In spite of the large market for ethylene oxide and the many processes that have been proposed for the manufacture of this product, no process has been found free of the handicaps and limitations characteristic of current operations, among these being cumbersome and expensive reactors, high dilution of the reaction gases and low conversion. Moreover, it has heretofore been found necessary to fractionate or otherwise separate ethylene or other desired olefins from the various gas mixtures in which they occur preparatory to reacting the olefin content with oxygen in the presence of a suitable catalyst. Such separation has been essential particularly in gas mixtures containing carbon compounds which are molecularly less stable than olefins, viz., carbon monoxide and acetylenic compounds, notably acetylene itself. These unstable compounds are highly reactive with oxygen under the reaction conditions prevailing in the oxygenation of olefins with the result that a considerable amount of reaction heat is liberated aggravating the already difficult problem of temperature control during the exothermic reaction of olefins and oxygen.

For such reasons, olefinic gases containing carbon monoxide and acetylene have been subjected to careful purification treatments to eliminate these unstable and highly reactive compounds before catalytically reacting the gases with oxygen to form olefin oxides. At present many refinery gases or similar mixtures are burned merely for their fuel value because the olefin content is relatively small and the cost of purification to eliminate carbon monoxide and acetylene is not justified. Accordingly, large quantities of olefins, especially ethylene, are annually wasted for lack of adequate processes for their economic recovery or utilization.

An important object of this invention is to convert olefins to the corresponding oxides by direct catalytic oxygenation of olefinic gas mixtures containing unstable and exothermically reactive compounds of the class of carbon monoxide and acetylenes.

Another important object is to provide a simple and efficient process for recovering in the form of oxides the olefin values of waste gases containing unstable carbon monoxide and acetylenes.

These and further objects of my invention will be apparent from the description which follows.

In accordance with this invention, refinery gases or hydrocarbon mixtures having an appreciable olefin content, say, not less than about 5% by volume, and containing carbon monoxide and/or acetylenes in an amount exceeding about 5% of the volume of the olefin content, are subjected to direct oxygenation in the vapor phase by contact with a fluidized mass of catalyst, particularly powdered silver catalyst, under carefully controlled reaction conditions. While the desired reaction between olefins and oxygen may be carried out over a broad range of temperatures, generally 150° to 400° C., depending upon the particular olefin and catalyst used and other reaction conditions, I have found it advantageous to maintain the reaction temperature in the range of about 200° to 300° C., and preferably 220° to 260° C., when utilizing silver catalysts of high activity. The catalyst may be in the form of massive silver particles with or without suitable promoters or activators like platinum, gold, manganese, and alkaline earth metal compounds, or such catalyst may be supported on fine particles of a carrier, e. g., finely divided refractory alumina.

While with prior processes for the oxygenation of olefins it has been imperative to remove substantially all of the carbon monoxide and acetylenes present in any feed material containing olefins, I have found that such purification pretreatment can be avoided when the oxygenation reaction is conducted in a mass of fluidized catalyst in contact with ample cooling surfaces so that the reaction temperature is kept within very narrow limits of the desired value and the reaction made to proceed with the production of olefin oxides notwithstanding the presence of a substantial proportion of unstable carbon monoxide and acetylene, in some cases, as much as 50% by volume based on the olefin content of the feed material. This is indeed remarkable in the light of the prior art which, for instance, includes teachings that minute quantities of acetylene will poison the oxygenation catalyst or otherwise impair the conversion of olefins to the corresponding oxides. While I do not wish to be bound to any theory or explanation, in my experience, the difference is attributable to the vigorous and random movements of the catalyst particles in a fluidized mass so that different particles are continuously coming into contact with the entering olefin-containing feed. With fixed or stationary catalyst, the portion nearest to the reactor inlet would be exposed to the greatest concentration of reactants including the unstable compounds and therefore would be subjected to the greatest heat release. In other words, in a fluidized operation every catalyst particle is at all times in more or less the same condition of temperature, activation, adsorbed reactants, etc., but in other types of operation the catalyst mass is exposed to varying conditions so that some portions are overburdened and others relatively unused. These differences are usually not discernible with conventional measuring instruments; for instance, a thermocouple can be used to measure the average temperature of a relatively small zone of the catalyst mass but such average figure is substantially uninformative as to the actual temperatures of the many tiny loci of reaction within the small zone of the catalyst mass under observation.

My fluidized catalyst process not only permits the presence of carbon monoxide and acetylene in the feed to the reaction zone but also makes it unnecessary to dilute the reactants by the addition of steam, carbon dioxide and the like. Furthermore, the reactants may be brought together without using a large excess of either one, which heretofore has been practiced to effect dilution of the highly exothermic reactants without introducing extraneous diluents like carbon dioxide.

The feasibility of catalytically oxygenating olefins without diluting either the olefin-containing or the oxygen-containing stream is disclosed in detail in my copending application Ser. No. 685,045, filed July 20, 1946. As in the process of the copending application, air may be used to provide the oxygen for this process but it is advantageous to utilize oxygen in a more concentrated form, say, oxygen-enriched air obtained by air rectification and containing at least 35% by volume of oxygen. Preferably, oxygen of at least about 95% purity is used in the oxygenation of olefins by this invention. Similarly, while any gaseous fraction containing ethylene and similar olefins, like the gaseous fraction obtained from catalytic cracking or reforming operations, may be employed in the production of valuable olefin oxides, it is desirable to select fractions having an olefin content of over 50% by volume.

Theoretically, the oxygenation of ethylene proceeds according to the reaction:

$$1C_2H_4 + 0.5O_2 \rightarrow 1C_2H_4O$$

However, the conventional processes with which I am acquainted inevitably involve a substantial consumption of the ethylene in undesired side reactions including complete oxidation according to the equation:

$$1C_2H_4 + 3O_2 \rightarrow 2CO_2 + 2H_2O$$

It is obvious that the least reaction consumes six times the amount of oxygen required to form ethylene oxide. By my process it is possible for the first time to curtail the quantity of olefin that is completely oxidized to less than about 10% of the ethylene converted in the reaction. Not only is this highly significant commercially in terms of improved yields but also it becomes economically feasible to use oxygen-rich fractions since the waste of oxygen in undesired side reactions is materially decreased. For efficient operation of the present process, I find it advisable to control the ratio of reactants so that for each volume of ethylene or like olefin not more than 1.0 volume, preferably not more than 0.75 volume, of oxygen is provided to the catalytic reaction zone. Such limitation, in effect, prevents inordinate dilution of the reactants by excess oxygen. To avoid material dilution of the reactants by excess olefin, it is advisable to provide not less than 0.4 volume of oxygen with each volume of olefin entering the reaction zone.

In addition to the oxygen which I provide for the oxygenation of the olefins in any given feed, I supply sufficient oxygen to satisfy the stoichiometric requirements for oxidizing the unstable impurities of the feed to carbon dioxide and water, e. g., $$1CO + 0.5O_2 \rightarrow 1CO_2$$
$$1C_2H_2 + 2.5O_2 \rightarrow 2CO_2 + H_2O$$

Experience indicates that with high catalyst activity readily attainable with the fine silver powders that may be employed in my fluidization process the contact or residence time of the reactants within the reaction zone is advantageously less than 5 seconds. In spite of the limited reaction time high conversions are realized.

For more detailed description and further clarification of this invention, reference is made to the accompanying drawing which is a sectional elevation schematically showing a preferred form of apparatus for conducting my process.

An elongate vessel 1, desirably cylindrical in shape, has a frusto-conical bottom 2 terminating in inlet pipe 3 for one of the gaseous reactant streams. A distributor 4 with apertures 5 serves to introduce the other reactant stream supplied through pipe 6. Distributor 4 is disposed in the lower portion of vessel 1 and is arranged to discharge one reactant into the other entering by way of inlet 3, in rapid mixing relationship and in proximity to the cooling tubes 8. The upper portion of the reaction space of vessel 1 ends at plate 7 having a plurality of dependent cooling tubes 8. The lower ends 9 of tubes 8 are sealed off while the upper ends 10 are open and fastened to openings in plate 7 by welding, brazing or the like. Within each tube 8 there is a smaller tube 11, open at both ends 12 and 13 and attached by the upper end 13 to an opening in tube sheet 14. The plates 7 and 14 are disposed in spaced relationship and with collar section 15 form a header 16 establishing communication between cooling tubes 8 and coolant outlet pipe 17. Tube sheet 14 cooperates with dome section 18 to form a second header 19 into which coolant is introduced by way of inlet pipe 20. With this arrangement, the coolant, e. g., water, flows from header 19 into the multiple tubes 11, discharges from the open ends 12 into the sealed ends 9 of tubes 8, rises through the annular spaces between tubes 8 and 11, flows into header 16 and is withdrawn through pipe 17. By control of the circulating coolant, the cooling surfaces of tubes 8 immersed in the fluidized catalyst mass can be maintained at the desired temperature. It will be clear to those skilled in the art that the described arrangement of cooling surfaces not only places the cooling surfaces uniformly and closely in contact with the reacting components but also avoids interference by the cooling tubes with the fluidization of the powdered catalyst.

In operation, one of the reactants, say, an ethylene-rich stream, enters vessel 1 through inlet pipe 3 and is quickly and thoroughly mixed with the oxygen-containing stream discharged through the openings 5 of distributor 4. The commingled gaseous reactants flow up through the catalyst mass 21 maintaining therein a well-fluidized condition. The dense phase of the fluidized mass 21 has an upper pseudo-liquid level 22 from which the reaction gases emerge into settling zone 23. While the reaction gases become disengaged from the bulk of the catalyst at pseudo-liquid level 22, a small proportion of the catalyst particles is usually entrained in the gaseous effluent. Some of the entrained particles tend to settle out of the gases in space 23 but positive separating means are generally adopted to effect complete separation. Simple and effective separation results when the outlet pipe 24 is provided with a filter element 25, e. g., a sheet of porous alundum. Preferably, the reactor has two or more outlets for the reaction products so that the filter elements can be individually blown back at regular periods to prevent build-up of an appreciable layer of catalyst powder on the filtering surface without at any time interrupting the withdrawal of reaction products from the vessel. For simplicity of presentation, the drawing shows vessel I as having two reaction product outlets 24 and 24' with filters 25 and 25', respectively. The outlet pipe 24 communicates with branch pipes 26 and 28 controlled by valves 27 and 29, respectively. Similarly, outlet pipe 24' communicates with branch pipes 26' and 28' controlled by valves 27' and 29', respectivey.

During one period of operation (represented by full line arrows in the drawing), the gaseous reaction products pass through filter 25 in pipe 24 and discharge through open valve 27 and branch 26 into suitable equipment for the further treatment or utilization of the reaction products. In this period, valve 29 of branch 28 and valve 27' of branch 26' are closed but valve 29' of branch 28' is open and is used to introduce a suitable fluid such as steam to blow back any catalyst powder deposited on the surface of filter 25' during a preceding period of operation. The blow-back fluid should be substantially inert inasmuch as it becomes mixed with the reaction gases leaving the reactor.

During a succeeding period of operation (represented by dotted line arrows in the drawing), the four valve settings are reversed, valves 27' and 29 being open and valves 27 and 29' being closed, so that the reaction products flow through filter 25' and branch 26' to the recovery equipment while the blow-back fluid passes through branch 28 to clear filter 25 of accumulated catalyst powder.

By repeating these two succeeding periods of operation, it is clear that the reaction products can be withdrawn continuously from the reactor without interruption because of blow-backs to keep the filters clean.

To exemplify the invention more specifically, a refinery gas containing by volume 12.1% ethylene, 2.7% propylene, 1.6% carbon monoxide, 0.3% acetylenic compounds, and a remainder chiefly of hydrogen, carbon dioxide, methane, ethane and propane, is fed to a reactor of the type shown in the drawing along with a stream of air; the two reactant streams are proportioned so that there is 0.9 volume of oxygen present for each volume of olefin in the feed and sufficient additional oxygen to burn completely all of the carbon monoxide and acetylinic compounds in the feed. The reaction zone containing a multiplicity of cooling tubes is filled with a fluidized mass of catalytic silver powder, all of which passes through a 200-mesh screen and only 12% of which is retained on a 325-mesh screen. The reaction gases flow up through the reactor at a velocity of 1.2 feet per second; the contact time is 4.1 seconds. With the indicated gas flow the silver powder is maintained in a well-fluidized state so that a high rate of heat transfer is effected from the reaction mass to the water circulating through the cooling tubes disposed within the reactor. The flow of cooling water is controlled so that the fluidized reaction mass is maintained at a temperature of 250° C. with variations of less than ±5° C. throughout the mass even over prolonged periods of operation. The ethylene and propylene oxides recovered from the effluent reaction gases show a yield of 73%.

In another example, the process of the invention is applied to the gaseous reaction product of an operation wherein ethane is converted to ethylene by partial combustion with oxygen. Typically, such an operation comprises reacting ethane of about 95% purity with oxygen of about 98% purity, one volume of oxygen being provided for each three volumes of ethane. The ethane preheated to a temperature of 600° C. and the oxygen preheated to a temperature of 400° C. are mixed in a reactor filled with porcelain balls (40 mm. diameter). A vacuum of 350 mm. Hg is maintained on the reactor which operates at a temperature of about 880° C. and with a space velocity of 220 volumes per hour per volume of reaction space. The gaseous reaction product is quenched to a temperature of about 50° C. by a water spray. This product analyzes on the volume basis: 31.4% ethylene, 14.3% carbon monoxide, 0.8% acetylene, and the remainder comprising hydrogen, carbon dioxide, ethane, methane and a small amount of oxygen.

Without intermediate treatment, the above-described gaseous product is introduced into a reactor containing a fluidized mass of catalyst comprising 20% by weight of silver deposited on finely divided alumina. The powdered catalyst passes through a 200-mesh screen and only 20% of it is retained on a 325-mesh screen. Along with the introduction of the ethylene-containing gas there is supplied to the reactor a stream of oxygen of about 98% (from the same source used to convert ethane to ethylene) at a relative rate such that the stoichiometric requirement of oxygen to convert all of the carbon monoxide and acetylene to carbon dioxide and water is satisfied and the ethylene to oxygen ratio of the feed is 1.0 to 0.7. The reactants intermingle and flow up through the reactor with a linear velocity of about 1 foot per second, maintaining the catalyst mass in a well-fluidized state and thus promoting rapid transfer of reaction heat from the mass to cooling tubes in contact therewith. By indirect heat exchange, the reaction temperature is closely regulated to 240° C. The contact time in the reaction zone is 3.8 seconds. The quantity of ethylene oxide recovered from the reaction gases corresponds to a yield of 77%.

It is advisable in conducting the process of this invention to employ an arrangement of apparatus similar to the arrangements described in my copending application Ser. No. 685,045, particularly when the reactants are in highly concentrated form as in the immediately preceding example. As shown in the copending application, the mass of fluidized catalyst is disposed in two contiguous and communicating zones so that the reaction gases flow directly from the reaction zone into an upper quenching or cooling zone without discontinuity in the fluidized phase. The cooling zone is maintained by direct or indirect heat exchange, e. g., by cooling tubes immersed in the fluidized catalyst mass in the upper zone, at a temperature below 200° C., preferably below about 150° C. The reaction gases thus are separated from the powdered catalyst at a relatively low temperature so that the danger of an explosion is greatly minimized.

Recently processes have been developed wherein petroleum fractions are catalytically treated in fluidized systems involving simultaneous oxidative regeneration of the catalyst in a zone adjoining the catalytic reaction zone. In this type of process, disclosed, for instance, in Thomas et al. patent U. S. 2,358,039 and Voorhees et al. patent U. S. 2,378,342, the catalytically treated hydrocarbon vapors and the regeneration gases, comprising generally about one part of carbon monoxide for every two parts of carbon dioxide, are withdrawn from the reactor as a single mixed stream. After the normally liquid fractions have been recovered from this stream, the residual gas fraction containing ethylene, propylene, methane, ethane, propane, carbon monoxide and dioxide, hydrogen, etc., may be profitably subjected without purification to the process of this invention to convert the olefinic values therein to valuable olefin oxides which, notably, are more easily separated, e. g., by water extraction, from the other gaseous components than the olefins themselves.

Another important application of my invention is the oxygenation of olefins in the tail gas of a Fischer-Tropsch type of operation wherein hydrogen and carbon monoxide are catalytically reacted to form liquid hydrocarbons suitable for use as motor fuels. As is known, such synthesis usually yields reaction gases which on cooling may be separated into an aqueous layer, a hydrocarbon layer and an uncondensed gas. Particularly where the synthesis reaction has been conducted to produce a motor fuel of high antiknock rating, for instance, by passage of hydrogen and carbon monoxide through a fluidized mass of iron catalyst maintained at a temperature of about 600° F. and pressure of about 250 pounds per square inch guage, the uncondensed gas separated from the reaction products will be found to be fairly rich in olefins such as ethylene and propylene and to contain unreacted carbon monoxide. This gaseous mixture may be utilized directly in my process without prior removal of carbon monoxide to produce desirable olefin oxides economically.

The newly developed hypersorption process is capable of separating hydrogen and methane from ethylene, ethane and heavier constituents of the gas stream of an ethylene plant. Similar olefin enrichment is obtainable by scrubbing the mixed gases with a copper-containing liquor, e. g., cuprous nitrate in aqueous ethanolamine solution. Ethylene or like olefin enriched by such methods will contain substantially all of the carbon monoxide and acetylenic compounds present in the original gas mixture but may be utilized in the process of my invention without the further expense of removing these unstable impurities from the olefin fraction.

The catalyst particle size and velocity of gas flow selected in carrying out my invention will depend upon such related factors as particle density and shape, gas density, etc., but in any case the best conditions for fluidization can be established by simple preliminary experiments. In general, the catalyst particle size will be below 100 mesh, preferably below 200 mesh, and the gas velocity through the reactor will fall in the range of 0.1 to 5.0 feet per second, preferably about 0.5 to 2.0 feet per second.

Those skilled in the art will visualize many variations of the invention without departing from its spirit or intent. For instance, one or both of the gaseous reactants may be introduced into the reactor at a plurality of vertically spaced points. Recycling of reaction gases may be practiced although this is unnecessary when the process operates under the indicated perffered conditions. Also, particularly with silver catalysts of very high activity, it may be beneficial to admix an inert powder such as graphite or Carborundum with the catalyst particles. Accordingly, the foregoing disclosure should be interpreted as being illustrative of the invention and not restrictive; only such limitations should be imposed as are indicated in the appended claims.

I claim:

1. The method of recovering the olefinic values of vaporized hydrocarbon mixtures containing not less than about 50% by volume of olefins and not less than about 5% of unstable impurities of the class of carbon monoxide and acetylenic compounds, based on the olefin content, which comprises passing a said vaporized hydrocarbon mixture and oxygen through a fluidized mass of comminuted silver oxygenation catalyst, proportioning said vaporized hydrocarbon mixture and oxygen so that the stoichiometric requirement of oxygen to convert said unstable impurities to carbon dioxide and water is satisfied and there is present about 0.4 to 1.0 volume of oxygen for each volume of contained olefin, maintaining said fluidized mass at a reaction temperature in the range of about 200° to 300° C., separating the reaction gases from said fluidized mass, and recovering the olefinic values of the thus treated hydrocarbon mixture in the form of olefin oxides.

2. The method of recovering the olefinic values of vaporized hydrocarbon mixtures containing not less than about 50% by volume of olefins and not less than about 5% of unstable impurities of the class of carbon monoxide and acetylenic compounds, based on the olefin content, which comprises passing a said vaporized hydrocarbon mixture and oxygen through a fluidized mass of comminuted silver oxygenation catalyst, proportioning said vaporized hydrocarbon mixture and oxygen so that the stoichiometric requirement of oxygen to convert said unstable impurities to carbon dioxide and water is satisfied and there is present not more than about 0.75 volume of oxygen for each volume of contained olefin, maintaining said fluidized mass at a reaction temperature in the range of about 220° to 260° C., separating the reaction gases from said fluidized mass, and recovering the olefinic values of the thus treated hydrocarbon mixture in the form of olefin oxides.

3. The vapor-phase process for converting ethylene containing not less than about 5% by volume of unstable impurities of the class of carbon monoxide and acetylenic compounds to ethylene oxide by direct oxygenation in the presence of a silver catalyst, which comprises proportioning a stream containing not less than about 50% by volume of said impure ethylene and a stream of air so that the stoichiometric requirement of oxygen to convert said unstable impurities to carbon dioxide and water is satisfied and there is present from about 0.4 to 1.0 volume of oxygen for each volume of ethylene, passing said reactants in said proportions through a fluidized mass of powdered silver catalyst, maintaining said mass at a reaction temperature in the range of about 200° to 300° C. by indirect heat exchange, separating the reaction gases from said mass, and recovering ethylene oxide from said separated gases.

4. The improved vapor-phase process for converting olefins containing unstable impurities of the class of carbon monoxide and acetylenic compounds to the corresponding olefin oxides by direct oxygenation in the presence of a silver catalyst without substantial dilution of the reactants, which comprises proportioning a stream containing not less than about 50% by volume of olefin, said olefin being admixed with not less than about 5% by volume of said unstable impurities, and a stream containing not less than about 35% by volume of oxygen so that the stoichiometric requirement of oxygen to convert said unstable impurities to carbon dioxide and water is satisfied and there is present from about 0.4 to 1.0 volume of oxygen for each volume of olefin, passing said reactants in said proportions through a fluidized mass of comminuted silver catalyst having an upper pseudo-liquid level and wherein said reactants are first passed through a reaction zone maintained at a reaction temperature in the range of about 200° to 300° C., and thereafter the reaction gases and comminuted catalyst are passed into a contiguous cooling zone below said pseudo-liquid level and maintained at a temperature materially below the reaction temperature, separating cooled reaction gases from cooled catalyst in said cooling zone, recovering olefin oxide from said cooled gases, and returning said cooled catalyst to said reaction zone.

5. The process of claim 4 wherein the olefin stream is predominantly ethylene.

6. The improved vapor-phase process for converting ethylene containing unstable impurities of the class of carbon monoxide and acetylene compounds to ethylene oxide by direct oxygenation in the presence of a silver catalyst without substantial dilution of the reactants, which comprises proportioning a stream containing not less than about 50% by volume of ethylene, said ethylene being admixed with not less than about 5% by volume of said unstable impurities, and a stream containing not less than about 95% by volume of oxygen so that the stoichiometric requirement of oxygen to convert said unstable impurities to carbon dioxide and water is satisfied and there is present from about 0.5 to 0.75 volume of oxygen for each volume of ethylene, passing said reactants in said proportions through a fluidized mass of comminuted silver catalyst having an upper pseudo-liquid level and wherein said reactants are first passed through a reaction zone maintained at a reaction temperature in the range of about 220° to 260° C., and thereafter the reaction gases and comminuted catalyst are passed into a contiguous cooling zone below said pseudo-liquid level and maintained at a temperature materially below the reaction temperature, separating cooled reaction gases from cooled catalyst in said cooling zone, recovering ethylene oxide from said cooled gases, and returning said cooled catalyst to said reaction zone.

FREDERICK W. SULLIVAN, Jr.

REFERENCES CITED

The following references are of record in the file of this patent:

UNITED STATES PATENTS

| Number | Name | Date |
| --- | --- | --- |
| 2,030,070 | Morrell | Feb. 11, 1936 |
| 2,373,008 | Becker | Apr. 3, 1945 |
| 2,424,086 | Bergsteinsson | July 15, 1947 |
| 2,430,443 | Becker | Nov. 11, 1947 |
| 2,458,266 | Heider | Jan. 4, 1949 |
| 2,471,104 | Gohr | May 24, 1949 |

FOREIGN PATENTS

| Number | Country | Date |
| --- | --- | --- |
| 434,011 | Great Britain | Aug. 23, 1935 |

OTHER REFERENCES

Fischer et al.: Chem. Abstracts, vol. 27, page 2016.